United States Patent [19]

Lukas et al.

[11] Patent Number: 4,687,287
[45] Date of Patent: Aug. 18, 1987

[54] APPARATUS FOR ALIGNING AN ARTICLE RELATIVE TO A DATUM

[75] Inventors: Helmut H. Lukas, Carleton Place; Grant K. Pacey, Kanata, both of Canada

[73] Assignee: Bell-Northern Research Ltd., Ontario, Canada

[21] Appl. No.: 559,447

[22] Filed: Dec. 8, 1983

[51] Int. Cl.⁴ .......................... G02B 6/36; B25B 1/06
[52] U.S. Cl. .................................. 350/96.20; 269/58; 269/142; 269/157; 269/902
[58] Field of Search .................. 350/96.20, 96.21; 65/4.1, 4.2; 219/121 PX; 156/158; 269/55, 58, 59, 60, 61, 87.2, 140, 142, 157, 160, 161, 162, 196, 202, 257, 902

[56] References Cited

U.S. PATENT DOCUMENTS

| | | | |
|---|---|---|---|
| 2,381,584 | 8/1945 | Fulleton | 269/902 X |
| 3,885,859 | 5/1975 | Dalgleish et al. | 350/96.21 |
| 4,274,707 | 6/1981 | Pacey et al. | 350/96.20 |
| 4,274,708 | 6/1981 | Cocito et al. | 350/96.21 |
| 4,313,744 | 2/1982 | Toda | 350/96.21 X |
| 4,319,902 | 3/1982 | Hensel | 350/96.21 X |
| 4,522,463 | 6/1985 | Schwenda et al. | 350/96.21 |
| 4,548,630 | 10/1985 | Biedka | 350/96.21 X |
| 4,556,282 | 12/1985 | Delebecque | 350/96.21 |

Primary Examiner—John Lee
Attorney, Agent, or Firm—Sidney Jelly

[57] ABSTRACT

Apparatus for aligning an article, for example an optical fiber, relative to a datum, for example a Vee groove, another fiber, or a light source, includes means for manipulating the article in two intersecting directions. The manipulating means comprises a part fixed relative to the datum and a first arm coupled to the fixed part by a hinge. A second arm is coupled by a second hinge to the first arm at a position adjacent the first hinge. Adjacent its proximal end, the second arm carries a mount for the fiber. The arrangement is such that pivoting of the first arm displaces the mount in one of the intersecting directions. Pivoting of the second arm displaces the mount in the other of the intersecting directions. Preferably, the fixed part, hinges and arms are integral with one another, substantially eliminating play and backlash. The apparatus affords precise manipulation of articles such as single-mode optical fibers prior to and during fusion splicing. Another aspect of the invention comprises an arrangement of two gripping jaws, one for each of two filaments, and two actuators, one for each gripping jaw, disposed either side of a medial plane through the apparatus. The right-hand actuator operates the left-hand jaw, and vice-versa. A third aspect comprises gripping means in the form of a tappet to distribute contact along the fiber, preferably pivotal slightly to ensure even contact with the fiber throughout the contact region.

23 Claims, 15 Drawing Figures

APPARATUS FOR ALIGNING AN ARTICLE RELATIVE TO A DATUM

The invention relates to apparatus for aligning an article relative to a datum, which might be another article or a support therefor, and is especially, but not exclusively, applicable to apparatus for aligning and fusion-splicing optical fibers.

Generally, fusion-splicing of optical fibers involves cleaving each fiber to provide a flat, perpendicular end surface. The fibers are aligned axially with each other with their ends close together. The ends are heated, usually by an electrical discharge, then pushed together to cause them to fuse.

In known apparatus for fusion splicing optical fibers in this way, for example as disclosed in U.S. Pat. No. 4,274,707, each fiber is clamped into the apex of a respective one of a pair of Vee grooves, which are fixed in accurate alignment with each other. Theoretically, once the exteriors of the fibers are thus aligned, the cores will also be aligned. This assumes, of course, that the cores are concentric with their respective exteriors, and that the latter are both the same diameter. In practice, however, the core of a typical fiber, having a cladding 125 to 150 microns diameter, may be eccentric by several microns with a concomitant misalignment of the cores even though the exterior might be perfectly aligned. Also, the external diameter may vary from one fiber to another with the same result.

Such misalignment can be tolerated in some cases, such as when fibers are the multimode type with a core of, typically, between 50 and 80 microns diameter. In other cases it cannot, such as when the fiber is the single mode type with a core diameter of only about 10 microns or even less. For acceptable splice losses to be achieved, such single mode cores must be aligned to an accuracy that cannot readily be achieved.

In particular, problems arise in providing apparatus which will manipulate the movable fiber with the required precision. Known mechanisms for achieving such precision are usually intricate and expensive and suitable only for laboratory conditions. However, apparatus for fusion splicing optical fibers may need to be used "in the field", for example in a manhole, and so must be robust, simple to maintain, and easy to use.

According to one aspect of the present invention, apparatus for manipulating an article in two intersecting directions for aligning it relative to a datum comprises:

a part fixed relative to said datum;

a first arm coupled to said part by a first hinge;

a second arm coupled by a second hinge to said first arm at a position adjacent to the first hinge, said second arm having a mount for supporting said article at a position adjacent said second hinge; and means for displacing said arms pivotally to and fro in the same direction relative to their respective hinges.

The arrangement is such that movement of the first arm about the first hinge displaces the second hinge, and therewith the mount, in one of said intersecting directions and movement of said second arm about the second hinge displaces the aount in the other of said intersecting directions.

Preferably, the respective hinge axes of the first and second hinges are parallel to one another and spaced apart in one of said two intersecting directions. The mount is spaced from the second hinge axis in the other of said two intersecting directions. Means are provided for pivoting each of the arms about its hinge, the arrangement being such that pivoting movement of the first arm displaces the second hinge bodily in the other of said intersecting directions, and pivoting of the second arm about the second hinge axis displaces the amount in said one of said intersecting directions.

In preferred embodiments of the invention, the hinges are integral with the arms, conveniently formed from a solid block of material, such as aluminum, by appropriately-positioned slots.

The means for displacing each arm may comprise, for example, an eccentrically-mounted ball bearing cam, rotation of which may be by means of rack-and-pinion mechanism giving precise control with minimal backlash and play. The rack may conveniently be moved to and fro by a vernier mechanism such as is used in a conventional micrometer. In a particularly compact arrangement, the arms extend substantially paralled to each other, with spring means acting between the arms to urge them apart. Then each cam urges the associated arm against the action of the spring means.

In those embodiments of the invention specifically for fusion-splicing optical fibers, the mount comprises a Vee groove into which one of the fibers is gripped. The apparatus then further comprises a second Vee groove, serving as the datum, into which the second optical fiber is gripped. The Vee grooves are arranged end-to-end with their apexes substantially aligned and, preferably, their corresponding surfaces substantially coplanar.

Where two filaments are to be aligned end-to-end, such as is necessary when fusion splicing optical fibers, it is usual for the gripping means to be released and the fibers or filaments moved longitudinally to a desired position, for example almost touching.

According to a second aspect of the invention, apparatus for aligning two filaments end-to-end comprises:

support means for supporting the two filaments in end-to-end alignment along an axis;

two gripping means, each cooperating with the support means to grip a respective one of the filaments to the support means;

two actuators, for example levers, projecting with their distal ends to opposite sides, respectively, of a plane extending between the gripping means and substantially perpendicular to wherein each actuator the axis serves to operate the gripping means at the opposite side of said plane.

This second aspect of the invention has the advantage that the operator can use his left hand to operate the lever that releases the right hand filament or fiber, which he can then position using his right hand, and vice versa. Such an arrangement is particularly useful when the juxtaposed ends of the filaments are being observed through a microscope.

In preferred embodiments, each said gripping means comprises a pivotal jaw member. The apparatus may then further comprise a push-pull or connecting rod serving to transmit the action of the corresponding lever to said jaw, such that reciprocating movement of said rod causes pivoting of the jaw to grip or release the fiber.

According to a third aspect of the present invention, apparatus for aligning at least one filamentary article relative to a datum comprises:

a Vee groove for receiving said filament in its apex; and gripping means for clamping said filamentary article into said apex, said gripping means comprising a tappet member for contacting said filamentary article over a significant part of its length and at a position disposed away from said apex, and biassing means for urging said tappet means towards said apex.

An advantage of such an arrangement, wherein with the filament is distributed, is that flexing of the free end of the filament away from the apex of the groove is inhibited. Such flexing may occur when only a knife-edge contact urges the filament into the groove and, though slight, may be intolerable when precise alignment is required, such as when aligning single-mode fibers.

Preferably the tappet member comprises a thimble, and said biassing means contacts said thimble at a central point of its internal end surface so as to permit pivoting of the thimble about said point. An advantage of such an arrangement is that the thimble can rock slightly when urged into contact with the fiber or filament and thus facilitate proper seating of the end surface, against the filament, throughout substantially the whole of its width. The biassing means may conveniently comprise a spring arranged to point-contact the tappet member.

An embodiment of the invention will now be described, by way of example, with reference to the accompanying drawings, in which

FIG. 3 is a sectional detailed view on line Z—Z of FIG. 1, and FIG. 3A a corresponding sectional side view;

The apparatus illustrated in the drawings is for aligninlg and fusion-splicing two optical fibers. The apparatus comprises a support member or housing 10 formed from a block of aluminum. The front of the block 10, i.e. the face presented to the operator, is stepped from the top and front to form a flat horizontal surface 12 and a generally flat vertical front surface 14. A generally rectangular recess 16 is formed in the left side of the block 10, (as viewed from the front) and extends from the bottom of the block 10 to a position adjacent the top of the block. The recess 16 is central between the front and back of the block 10, occupying about half the depth of the block in that direction. The front wall 18 of recess 16 extends a short distance forward of a continuation of the vertical surface 14.

A second block 19, of aluminum, comprising a first part 20, a first arm 22, and a second arm 24, occupies the recess 16. The profile of the second block comprising parts 20, 22 and 24, is substantially the same as that of the recess 16, as can be seen from FIG. 1. The part 20 is securely anchored in the top of recess 16 by two securing screws 26 and 28. The latter (28) extends from the left-hand side of the apparatus through anchorage part 20 into the block 10 and the former (26) extends at about 45° downwards through the rear corner of recess 16 into a threaded hole in part 20 so as to draw part 20 tightly into the corner of recess 16.

Figure 1:
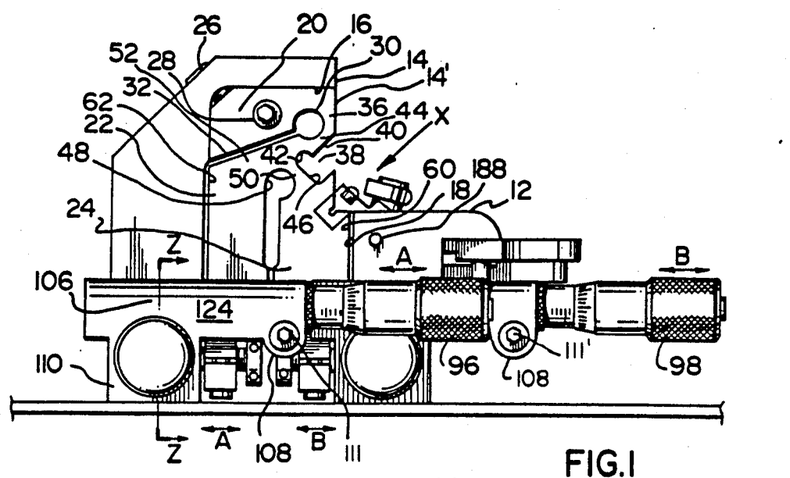
FIG. 1 is a side view of apparatus for fusion-splicing two optical fibers.

The anchorage part 20, and arms 22 and 24, are formed from a solid block, being delineated by suitably positioned holes and slots. Thus, a hole 30 extends through the block 19 adjacent its front and top, leaving a narrow neck portion 36. A slot 32, inclined slightly to the horizontal, extends upwards from the rear face of the block 19 to the hole 30. The slot 32 separates the part 20 from the arms 22 and 24 except for narrow neck portion 36 between the hole 30 and the front face 14' of block 19.

From the lower end of neck portion 36, a short recess 38 extends at 45° downwards into the front face 14' of block 19. The recess 38 has its upper sidewall 40 undercut at its lowermost part to form a recess 42. A short web of material between the upper sidewall 40 of recess 38 and hole 30 thus forms a flexible hinge member 44 connecting arm 22 to anchorage part 20.

The bottom of recess 38 extends perpendicular to its sidewall 40. A second hole 48 extends through the block 19 at a position slightly below and rearwardly of the bottom surface 46 of recess 38. A narrow portion of material between hole 48 and recess 38, of similar thickness to flexible hinge member 44, serves as a second hinge 50 connecting the proximal part 52 of arm 22 (i.e. that adjacent the hinge 44) to the second arm 24. A vertical slot 54 communicates at its upper end with hole 48 and extends between arms 22 and 24 to the bottom of block 10, permitting relative movement between the arms 22 and 24 in the forward and rearward directions.

As can be seen from FIG. 1, the front arm 24 is separated from the front of the recess 16 by a clearance space 60 and the rearward arm 22 separated from the rear face of the recess 16 by a similar clearance 62. These clearances permit slight flexing of the arms 22 and 24 to and fro.

Figure 2:
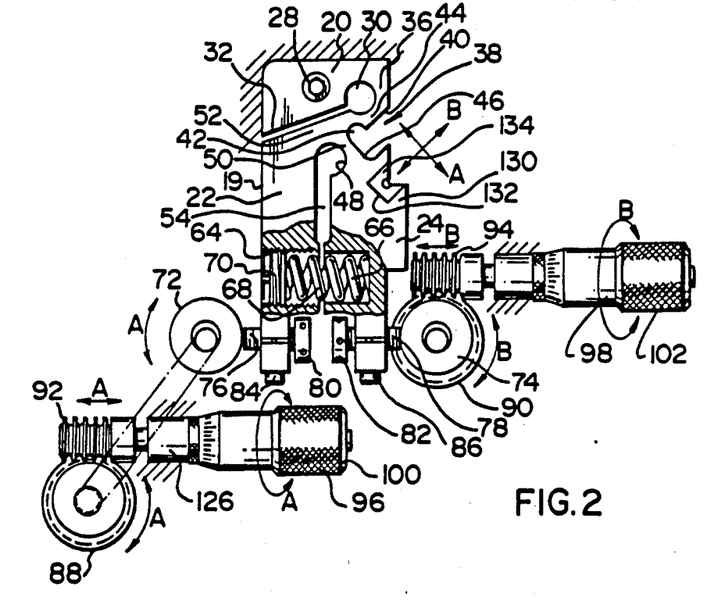
FIG. 2 is a schematic representation of a part of the apparatus which is for moving one fiber transversely relative to its length.

As shown in FIG. 2, the rear arm 22 has a screw-threaded hole 64 extending through it from front to rear. The hole 64 is aligned with a recess 66 extending into the rear face of front arm 24. A spring 68 extends from recess 66 into hole 64 and is retained therein by a cap screw 70 screwed into hole 64. The spring 68 acts between the bottom of recess 66 and the screw 70 to urge the two arms 22 and 24 apart. The strength of the spring 68 is much greater than the force required to flex the hinge members 44 and 50.

Means for displacing the arms 22 and 24 to and fro comprises eccentrically-mounted cam bearings 72 and 74, respectively. (See FIG. 2.) The cam bearings 72 and 74 cooperate with cam follower pins 76 and 78, which comprise the ends of screws 80 and 82, respectively. Screw 80 extends through the bottom end of rear arm 22 with its end projecting rearwards and can be locked by a locking screw 84 extending upwards into the bottom of the arm 22. Screw 82 extends through the bottom of arm 24, with its end projecting forwards, and can be locked in a similar manner by a screw 86 extending into the bottom of arm 24.

The cam bearings 72 and 74 are coupled to pinions 88 and 90, respectively, for rotation thereby. The pinions 88 and 90 engage racks 92 and 94, respectively, which are connected to corresponding conventional vernier screw mechanisms 96 and 98. The vernier screw mechanisms 96 and 98 are anchored to the block 10 so that adjustment of the vernier spindles 100 and 102 produces reciprocating movement of the respective racks 92 and 94 relative to the block 10.

Figures 3, 3A:
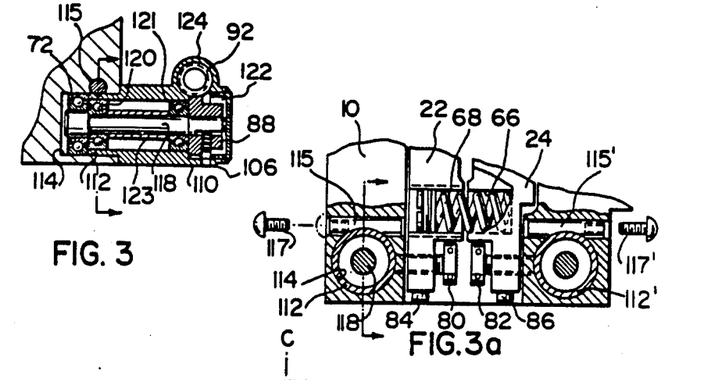

Both drive mechanisms are similar and one will be described with reference to FIGS. 3 and 3A which show cross-sections through the rear part of the block 10. The drive mechanism is housed in part by a housing 106 comprising a portion 110 of rectangular external shape which has its end reduced in cross-section to form a circular spigot 112 which fits closely into a hole 114 in the side of the block 10. The spigot 112 is secured by a key 115 in the form of a pin extending tangentially to the spigot 112. The key 115 has a curved indent 116 (see FIG. 3A) which conforms to the surface of spigot 112. A screw 117, screwed into the end of pin 115, urges it outwards, thus clamping the spigot 112 firmly in the hole 114.

The bearing cam 72 is mounted eccentrically on the innermost portion of a shaft 118, which is supported by a pair of bearings 120 and 121, spaced apart by a spacer sleeve 123 around the shaft 118. The shaft 118 extends into a round concentric cavity 122 in the outer end of rectangular housing portion 110. The gear pinion 88 is securely fixed to the end of shaft 118 in the cavity 122. The housing 106 has a tubular part 124 which extends substantially tangentially to the cavity 122 towards the front of the apparatus. The vernier drive mechanism 96 is mounted coaxially with the tube 124 so that the rack 92 projects into the tube 124 and engages the pinion 88. The vernier drive sleeve 126 fits into the forward end of tube 124 which is split to form a clamp 108 which is tightened by means of screw 111.

In operation, rotation of the vernier thimble 100 as indicated by arrow A, causes movement of rack 92, which rotates pinion 88, and therewith eccentric cam 72. The cam 72 displaces pin 76 to cause arm 22 to move to and fro. This will cause the proximal portion 52 adjacent hinge 44 to pivot about the hinge 44, displacing hinge 50 bodily in the direction of arrow 'A'. The part 130 of second arm 24 proximal the hinge 50 therefore moves in the same direction. This proximal part 130 has a recess 132 of rectangular cross-section extending across it. Recess 132 serves as a mount for a Vee groove 134 which will carry the optical fiber to be aligned. The sidewalls of recess 132 extend at approximately 45° downwards from the front face of arm 24. The sides of Vee groove 134 are mutually perpendicular and coplanar with, respectively, front face 14' of block 19 and the horizontal surface or apron 12 at the front of the apparatus. When adjustment of vernier thimble 100 produces movement of mount 130 in the direction of arrow 'A', the Vee groove 134 moves likewise, thus displacing the fiber transversely to its length.

It will be appreciated that movement of the proximal part 130 of arm 24 is only slight and is possible despite the fact that forward movement of the lower end of arm 24 is prevented by cam 74. When movement of the vernier 96 produces a corresponding flexing of the hinge 44 to move the mount 132 rearwardly, movement of the lower part of arm 24 is again prevented, but this time by the spring 68.

Adjustment of vernier 98, as indicated by arrow 'B', will cause its rack 94 to reciprocate thus rotating the pinion 90 and therewith eccentric cam bearing 74, which will cause movement of the cam follower screw 82 in the lower end of arm 24. This will cause the second arm 24 to pivot about its hinge 50. Movement of arm 22 at its lower end is prevented by cam 72 and spring 68, tending to limit movement of its proximal part 52, which is connected to hinge 50. Thus the mount 132 and the Vee groove 134 will be moved primarily by pivoting about hinge point 50 which, in the case of such small movements, can be considered as a linear movement in the direction of arrow 'B', i.e. perpendicular to arrow 'A'.

Thus by adjustment of the two verniers 96 and 98, the Vee groove 134 can be moved in two mutually perpendicular directions 'A' and 'B' relative to the longitudinal axis of the fiber in the apex of the groove.

Figure 4:
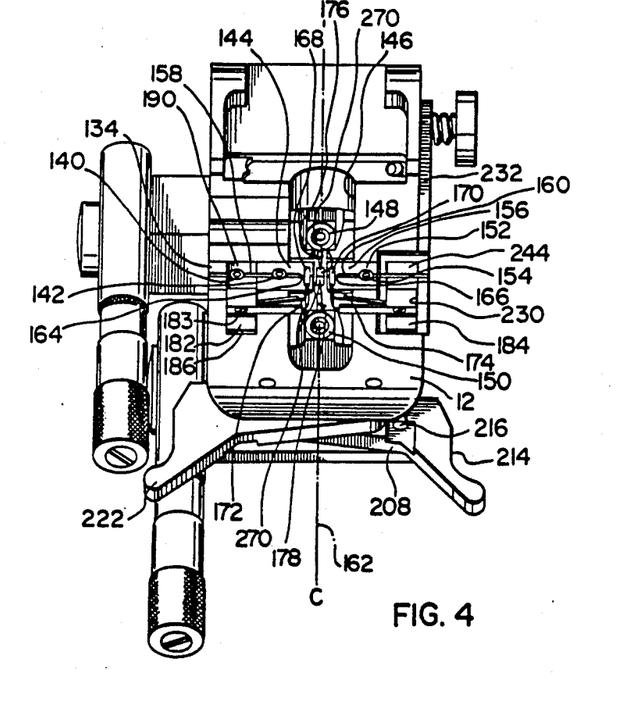
FIG. 4 is a view of the apparatus in the direction of arrow X in FIG. 1.

Referring now to FIG. 4, it will be seen that Vee groove 134 is secured into its underlying recess 132 by two screws 140 and 142, respectively. Its inner end 144 extends in cantilever fashion into a hole 146 which extends through the middle of block 10. The hole 146 is of rectangular section and extends downwards at 45° to the horizontal, opening onto both horizontal surface 12 and the vertical front face 14. Electrode assemblies 148 and 150, respectively, disposed above and below the longitudinal axis of the Vee groove 134 are mounted in a block 135 of phenolic resin, slidably located in hole 146. The electrode assemblies comprise electrode pins 176 and 178, respectively, which extend end-to-end either side of the longitudinal axis of the fibers when held in the Vee grooves, such that the longitudinal axis of the electrodes intersects that of the fibers.

Figure 9:
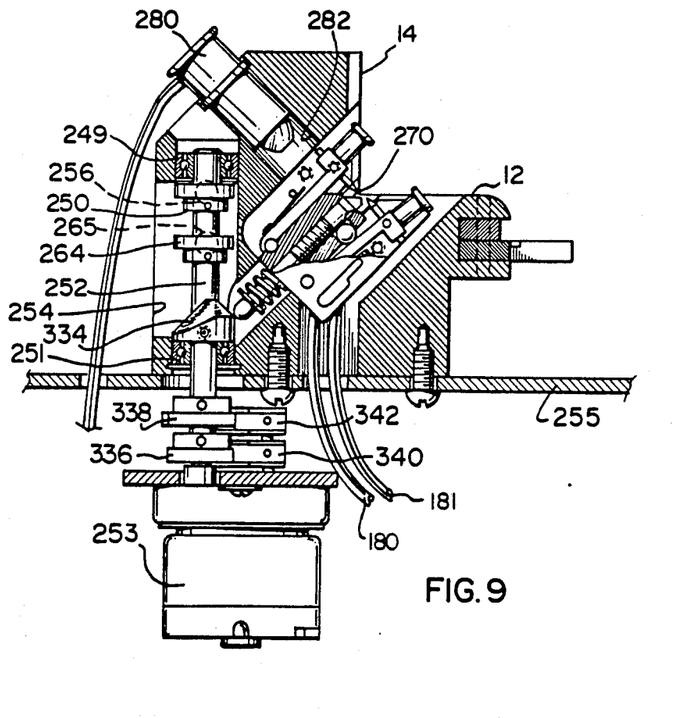
FIG. 9 is a sectional side view taken on line C—C of FIG. 4.

As shown in FIG. 9, the electrodes are connected by two wires 181 and 180, respectively, to an electrical supply (not shown) which, in use, produces a spark discharge across the gap between the ends of the electrodes. The spark discharge thus occurs in the region of the juxtaposed ends of the two fibers and heats them so that they can be fused together.

A second Vee groove 152 is mounted at the opposite (right-hand as shown in FIG. 4) side of cavity 146. The Vee groove 152 is secured by a screw 154 into a corresponding recess and extends with its inner end 156 projecting in cantilever fashion into hole 146 and in substantial alignment with Vee groove 134, i.e., the corresponding surfaces of Vee grooves 134 and 152 are substantially coplanar.

Before the fiber is inserted into the apparatus, the outer coating is stripped away from its end for a short distance to leave only the glass cladding and core.

The Vee grooves 134 and 152 have grooves 158 and 160, respectively, located in their apexes. The grooves 158 and 160 extend from the outermost ends to a position close to the ends adjacent the center line 162 of the apparatus. The grooves 158 and 160 are of circular cross-section and are arranged to be a close fit for the optical fiber which has not had its outer coating stripped away.

The cylindrical axes of grooves 158 and 160 are aligned with the apexes of their respective Vee grooves 134 and 152. Small rectangular recesses 168 and 170, respectively, extend transversely across the part of the corresponding Vee groove between the end of the groove 158 or 160 and the end of the Vee groove itself. The recesses 168 and 170 each provide a seating for a respective one of the inturned ends of a pair of spring fingers 172 and 174, respectively, which serve as grippers for the part of the fiber located in the apex of the Vee groove, which has had its outer coating removed.

Figure 7:
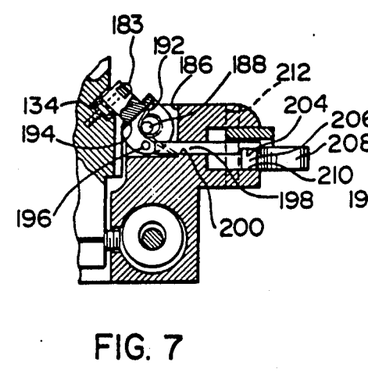
FIGS. 7 and 8 are sectional detail views of a gripper jaw of the apparatus taken on line Y—Y of FIG. 5.

The spring fingers 172 and 174 comprise leaf springs mounted upon gripper arms 182 and 184, respectively. Gripper arm 182 is pivotally mounted in a slot 186 which extends into the apron 12 from its upper surface. The arm 182 is mounted upon a pivot pin 188 (see FIGS. 1, 7 and 8) which extends through the recess 186 with its pivot axis parallel to the fiber axis.

Leaf spring 172 is mounted at one end onto the gripper arm 182 by a screw 183. When the arm 182 is in the closed position, the inturned end of leaf spring 172 rests in the recess 168, pressing the exposed cladding part of the fiber into the apex of Vee groove 134.

The left-hand Vee groove 134 has a recess 190, its width similar to that of recess 186, to accommodate the gripper arm 182 when the latter is pivoted into contact with the Vee groove. The depth of recess 190 may be such that the gripper arm 182 serves as a clamp to hold the coated fiber part into the circular groove 158 in the Vee groove 134. The arm 182 is spring-loaded by a coil spring 192 (see FIG. 7) which acts between the bottom of recess 186 and the interior of a slot 194 in the gripper arm 182 to bias the latter into contact with the Vee groove 134. A pin 196 extends laterally from arm 182 at a position below pivot pin 188. A push-pull or connecting rod 198 is slidably mounted in a hole 200 which extends from the recess 186 towards the front of the block 10. The push-pull rod 198 is aligned with the pin 196 so that when the push-pull rod 198 is pushed into the recess 186, it contacts pin 196 and rotates the gripper arm 182 out of contact with the Vee groove 134. When the push-pull rod 198 is moved forwards, i.e. out of groove 186, the arm 182 returns to the closed position under the action of coil spring 192.

Figure 8:
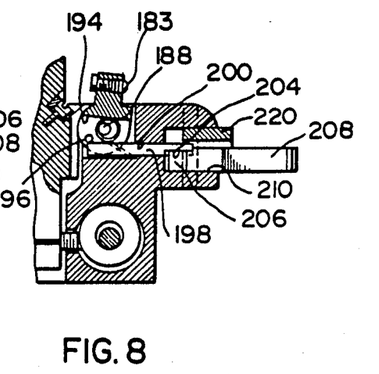

The push-pull rod 198 has a notch 204 at its forwardmost end. The notch 204 accommodates the end 206 of a lever member 208 which is mounted in a slot 210 in the front of block 10. The slot 210 extends across the entire width of the block 10. Lever 208 is secured in the slot by a pivot pin 212 extending vertically through slot 210 at a position adjacent the right-hand side of block 10. The distal part 214 of lever 208 projects outwards from the right-hand side of the block 10 so that it can be pivoted to and fro about pivot pin 212 by an operator. When the lever portion 214 is in the rearward position, shown in full lines in FIG. 5, the fiber is clamped. When the lever is moved forwards to the position shown in broken lines in FIG. 5, push-pull rod 198 is urged into recess 186 to open the gripper jaw 186. When the arm 182 is fully open the pin 196 overrides the end of push-pull rod 198, as shown in FIG. 8, so arm 182 will only return to the closed position again when the push-pull rod is moved forwards.

It should be noted that an operator can use his right hand to move lever 208 and open the left-hand gripper arm 182 to release the left-hand fiber. He can then adjust the position of the left-hand optical fiber using his left hand.

The mechanism for operating gripper arm 184 to open or close the right-hand gripper spring jaw 174 is a mirror image of that for operating the left-hand gripper jaw. Thus, a push-pull rod 216 extends through the front of the block 10 at the right-hand side and engages the end 218 of a second lever 220, the distal end portion 222 of which projects from the left-hand side of block 10. The lever 220 is mounted above the lever 208 in the slot 210 in the front of block 10 and is pivotal about pivot pin 224 adjacent the left-hand side of the block 10. Thus, the operator will use his left hand to operate lever 220 to release the right-hand gripper mechanism, while using his right hand to adjust the position of, or insert, the right-hand optical fiber in the groove 160.

Unlike the left-hand arm 182, gripper arm 184 is not mounted directly into block 10. Rather, arm 184 is mounted in a recess 230 in the end of a lever 232. The lever 232 extends towards the rear of the block 10 in a recess 234 in the right-hand side of the block 10. The arm 184 is mounted upon a pivot pin 236 extending laterally through the clevis formed by the recess 230 in the forward end of lever 232, and has a pin (not shown) to be engaged by the end of push rod 216 in like manner to that of the left-hand gripper jaw mechanism.

The upper front portion of lever 232 is stepped to provide a vertical surface 240 and a horizontal surface 242 substantially coplanar with the corresponding surfaces of the groove 160. The surfaces 240 and 242 have a central recess 244 to accommodate arm 184 when it is in the clamping position such that the pivot arm 184 will clamp the outer coating of the optical fiber into the apex of the Vee groove formed by surfaces 240 and 242.

The lever 232 is pivotally mounted in the recess 234 by a pivot pin 246 extending through suitably aligned holes in the block 10 and lever 232, respectively, from the underside of the block 10. A recess 235 (see FIG. 5) in the inner face of lever 232 houses a return spring 248 which biasses the front portion of lever 232 outwards, i.e., towards the right as shown in FIGS. 4 and 5.

When the outer coating of the fiber is gripped by pivot arm 184, pivotal movement of lever 232 about pivot pin 246 will cause the fiber to be moved in the direction of its length. The fiber will thus slide along the Vee groove 156, such movement being permitted by the leaf spring 174. Longitudinal movement of the fiber is required during the sequence of operations, in which the fibers are separated slightly while being heated, then pushed together to cause their ends to fuse.

Figure 5:
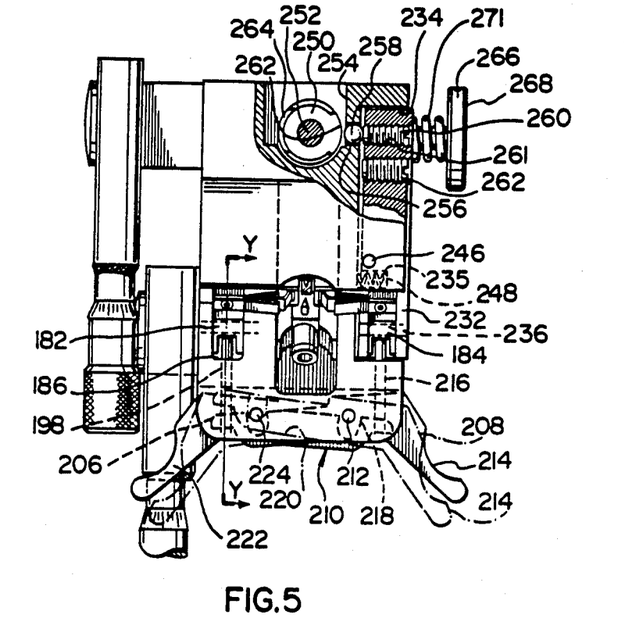
FIG. 5 is a plan view of the apparatus.

Lever 232 is actuated by means of a mechanism at the rear of block 10, as illustrated in the cut-away view of FIG. 5 and in FIG. 9. The mechanism comprises a cam 250 mounted upon a shaft 252 extending vertically in a cavity 254 at the rear of block 10. The shaft 252 is mounted in bearings 249 and 251, respectively, and is rotatable by a motor 253 located below a face plate 255 beneath the block 10. The cam 250 is positioned adjacent a hole 256 which extends between recess 254 and the recess 234 in the side of block 10. A ball 258 is located in hole 256 and serves as a cam follower. The ball is in contact with the end of a screw 260 which extends through a suitably screw-threaded hole 261 in the rear end of lever 232. A second screw, 262, extends through lever 232 from the outside and is arranged to abut the bottom of recess 234. Screw 262 serves to limit the movement of the rear part of arm 232 into the recess 234 when the cam 250 is rotated so that it is no longer in contact with ball 258.

Screws 260 and 262 control the separation of the fibers before and during the heating process by the spark discharge. Thus, in the position shown in FIG. 5, the lever 232 is in its initial position ready for insertion of the two optical fibers. The operator inserts the two optical fibers end-to-end after releasing the gripping springs 172 and 174 as described previously. Initially, the fibers are butted end-to-end such that the end surfaces meet in the plane of the two electrodes 176 and 178. The fibers are then held firmly by the gripping springs 172 and 174. The motor 253 is actuated for a short time. The separation cam 250 rotates, its lobe disengages ball 258 and allows the lever 232 to pivot inwards at the rear until screw 262 bears against the bottom of the recess 254. This gives the required separation of the ends of the fibers. The slight separation is required to permit relative movement of the ends of the fibers transversely to their longitudinal axes. The fibers are then manipulated using the vernier mechanisms which move the Vee groove 134 transversely relatively to the other Vee groove 152. During initial alignment in this way, the relative positions of the two fibers in the two directions 'A' and 'B' are observed with the aid of a mirror 270 disposed beneath the spark zone. The inclined surface of the mirror 270 extends towards the observer beyond the axis of the electrodes, so that, when viewed in the direction of arrow X of FIG. 1, the mirror provides a lateral view of the two fibers. The lower electrode 178 is movable away from the other electrode to allow the mirror to be interposed. The mechanism for moving the mirror is the subject of our copending patent application Ser. No. 559,448 filed Dec. 8, 1983, abandoned and filed as a continuation (Ser. No. 743,195). This mechanism will be described in more detail hereafter.

After initial alignment of the exteriors of the fibers using such visual inspection, precise alignment of the cores is done while monitoring the passage of a light signal across the gap between the fibers. Circuitry for supplying and detecting the light signal may be of conventional construction and so is not depicted. Manipulation of the fibers during the precise alignment stage using the light signal is still carried out using the vernier mechanisms 96 and 98.

Figure 6:
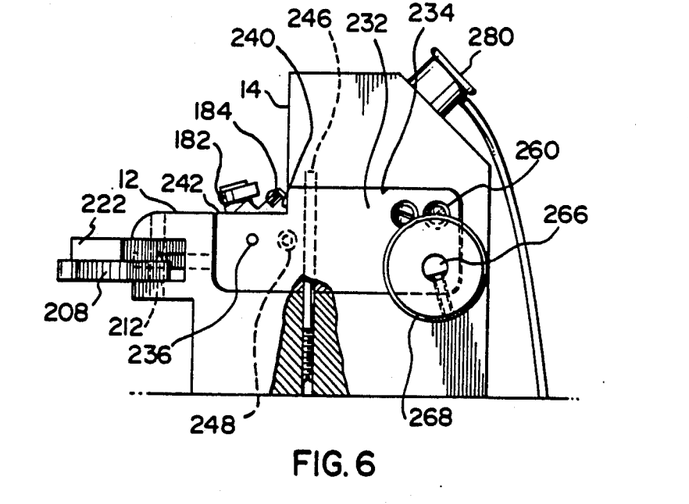
FIG. 6 is an opposite side view of the apparatus.

A second cam 264 is mounted on shaft 252 at a position slightly below cam 250. The lobe of cam 264 is diametrically opposite that of cam 250. A second ball 265, in a corresponding hole 267, serves as a cam follower and acts between cam 264 and the end of a third screw 266 which extends through the lever 232 at a position slightly below screw 260. (See FIG. 6.) Screw 266 has at its outer end a head or knob 268 and carries a coil spring 271 which acts between the surface of lever 232 and the underside of head 268 to eliminate play and provide friction to ensure that undesired movement of the screw 266 is prevented.

Once the fibers have been precisely aligned, the motor is actuated to rotate shaft 252. Rotation of shaft 252 lowers the mirror 270, restores electrode 178 to its operative position, and closes a switch to initiate the spark discharge. During the spark discharge, shaft 252 continues to rotate and, when the spark discharge has heated the fibers sufficiently, cam 264 actuates the associated ball 265 and displaces the rear part of the lever 232 outwards causing it to push the right-hand fiber back towards the center line of the apparatus. In order that the fibers will fuse, it is necessary for the right-hand fiber to be pushed beyond its original position. The lift of cam 264 and position of screw 266 are arranged to provide such additional movement. The extent of the additional movement of the end of the right-hand fiber beyond the axes of the electrodes may be adjusted by knob 268.

Figure 10:
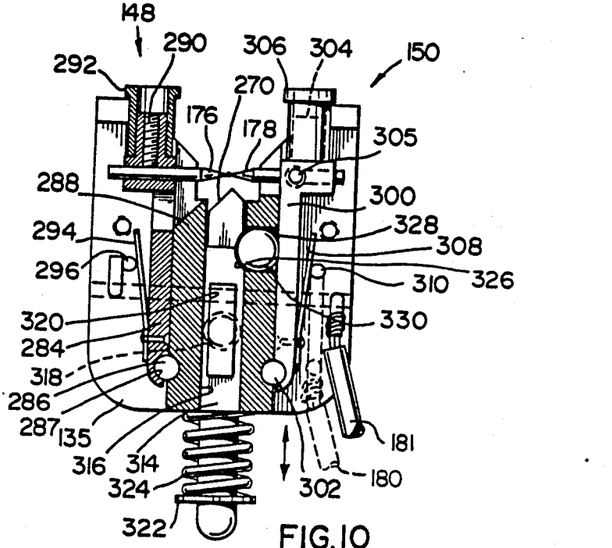
FIG. 10 is a sectional detail view showing the electrodes in the closed position.
Figure 11:
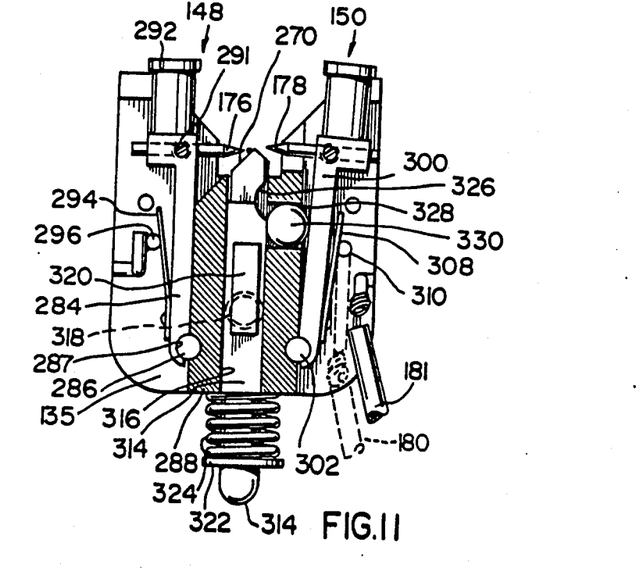
FIG. 11 is a view corresponding to FIG. 10 but with the electrodes in the open position.

The electrode assemblies 148 and 150, their associated operating mechanism, and the mirror 270 are shown in more detail in FIGS. 9, 10 and 11. As previously mentioned, the electrode assemblies 148 and 150 are mounted upon an insulator block 135 of phenolic resin material (or any other suitable insulating material) in hole 146 in the middle of the block 10. A lamp 280 is located in a hole 282 extending from the upper, rear corner of block 10 to hole 146 at a position adjacent the electrode pins 176 and 178 and serves to illuminate them and the ends of the fibers.

The insulator block 135 is of 'I' cross-section and the electrode assemblies 148 and 150 are accommodated one in each of the two channels of the I section. The fixed electrode assembly 148 (shown uppermost in FIGS. 1 and 4 and at the left in FIGS. 10 and 11) comprises an elongate brass bar 284 located at one end relative to the insulator block 135 by a pin 286 extending through the flanges of the block 135 adjacent its lowermost end. The end of the bar 284 has a notch 287 which engages the pin 286 to locate the bar 284 longitudinally. The bar 284 is biassed towards the central web portion 288 by a leaf spring 294 which is attached to the bar 284 at one end and bears against a terminal post 296. The bar 284 lies flat against the central web portion 288 of the insulator block 135 and protrudes slightly beyond the uppermost end of the web portion 288. Electrode pin 176, of sintered tungsten or other suitable material, extends transversely through the protruding end of bar 284 and is secured thereto by a screw 290 extending into the end of the bar 284. The tip of electrode 176 is arranged to be aligned with the longitudinal axis of the fibers when they are correctly positioned. An adjustment screw 291 extends into the bar 284 from one side to impinge upon the electrode pin 176. This screw 291 permits small lateral adjustments of the electrode 176.

A cylindrical handle 292, of insulating material, is secured to the protruding end of bar 284 so as to extend beyond the end of the insulator block 135. The electrode assembly 148 can be removed by pulling the handle 292, the notch 287 disengaging the pin 286 with a "snap-action". Electrical connection to the electrode pin 176 is by way of the leaf spring 294 and terminal pin 296, which is connected to the high voltage spark generator (not shown) by wire 181.

The movable electrode assembly 150 is similar in construction to the fixed electrode assembly 148. When in the "spark-discharge" position, shown in FIG. 10, it is a mirror-image of electrode assembly 148, and comprises a corresponding set of components, namely an elongate brass bar 300, located relative to the block 135 by a pivot pin 302 and having its own electrode pin 178 secured by a screw 304 to an end portion which carries an insulating handle 306. Lateral adjustment of the electrode 178 relative to bar 300 is by means of adjustment screw 305. The electrical connection is by way of a corresponding leaf spring 308 bearing against a terminal pin 310, which is connected to the spark generator by wire 183.

The main difference is that the movable electrode assembly 150 is pivotal about its locating pin 302 so as to displace its electrode 178 outwards from the axis of the fibers. Such displacement is achieved by means of a rod or plunger 314 which is slidably housed in a hole 316 extending through the central web portion 288 of the insulator block 135. The cylindrical axis of the plunger 314, the fiber axes, and the spark discharge path between the electrodes 176 and 178 are substantially mutually perpendicular.

The plunger 314 is prevented from rotating by a pair of set screws 318 which extend through opposite sidewalls of the web portion 288. Each set screw engages a corresponding one of two flats 320 on opposite sides of the plunger 314. Only one set screw and one flat are shown.

The lower end of the plunger 314 extends beyond the insulator block 135 and has a surrounding flange 322. A compression spring 324 carried by the plunger 314 acts between the end of insulator block 135 and the flange 322 to urge the plunger 314 downwards, i.e. away from the electrodes 176 and 178, to the position shown in FIG. 10. In this position, a cylindrical indent 326 in the plunger 314 is aligned with an elongated hole 328 which extends through the insulator block, including the web portion 288, adjacent the electrode arm 300. A roller 330, of insulating material, located in the hole 328 seats in the indent 326 and permits the arm 300 to lie flat against the juxtaposed surface of web portion 288. Consequently, the electrode 178 is in proximity to the fibers so that spark discharge may take place.

It should be noted that, during the spark discharge, the end of plunger 314, which carries the mirror 270 (extending at 45° to its longitudinal axis) is spaced well below the electrodes 176 and 178 to ensure that the mirror 270 is not spattered during the spark discharge step.

When the plunger 314 is displaced towards the electrodes 176 and 178, against the action of spring 324, the roller 330 is displaced out of indent or seating 326 and forces the electrode arm 300 away from the central web portion 288. This displaces electrode 178 outwards to the position shown in FIG. 11. At the same time, the mirror 270 is repositioned in close proximity to the fibers. As can be seen in FIG. 11, the mirror 270 actually extends beyond the plane occupied by the fiber axis and the spark discharge path. With the mirror 270 in this position, the fibers can be viewed directly in the direction of the longitudinal axis of the plunger 314. At the same time, the image of the fibers in mirror 270 can be viewed, giving the view of the fibers in a perpendicular direction, i.e., in the direction of the spark discharge path. The fibers can thus be aligned visually. The plunger 314, and with it mirror 270, can then be withdrawn, electrode 178 restored to its operative position, and the spark initiated.

Displacement of the plunger 314 is by means of a third cam, 334, on shaft 252. As shown in FIG. 9, cam 334 acts against the lower end of plunger 314. The shaft 252 also carries two cams, 336 and 338, respectively, beneath the faceplate 255. Cams 336 and 338 cooperate with corresponding limit switches 340 and 342 to control the spark discharge and the motor cycle, respectively.

A significant advantage of the displaceable mirror described hereinbefore is that the mirror can be positioned very close to the fibers during the alignment procedure. Consequently, the optical path via the mirror 270 is only slightly longer than that direct from the fibers. Therefore both the fibers and their image can be viewed without refocussing the microscope through which they usually are viewed. This simplifies the operating procedure since it is usual to focus directly upon the fibers to inspect their ends for satisfactory cleaving and freedom from contamination, then carry out the alignment. Another advantage of this configuration is that a single planar mirror can be used which is much easier and cheaper to make than the Vee-shaped mirrors used hitherto. Also, a single mirror surface does not present problems of alignment with the fiber axis and optical axis of the microscope, which might occur with Vee-shaped mirrors in view of the precision required.

Figure 12:
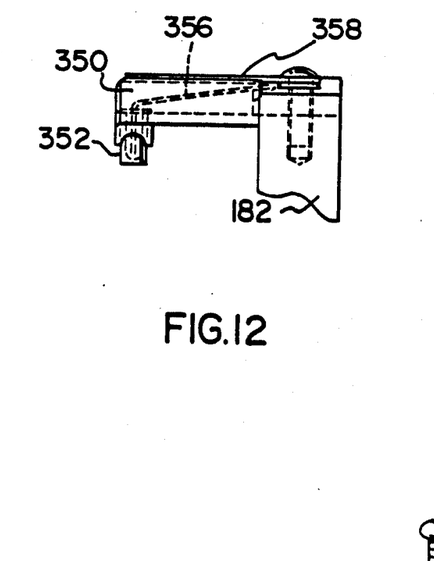
FIG. 12 is a side view of a modified gripper jaw.
Figure 13:
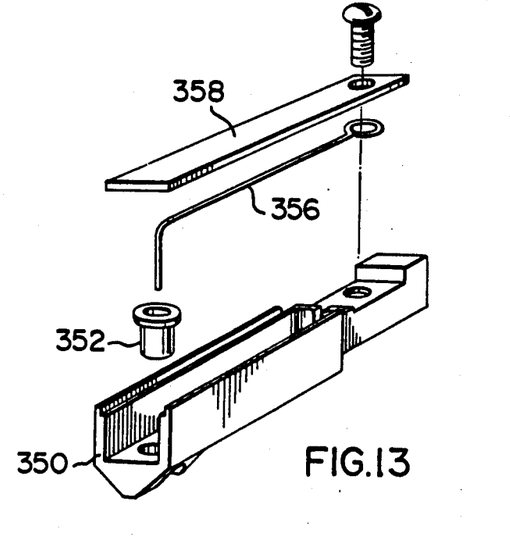
FIG. 13 is an exploded perspective view of the modified gripper jaw.
Figure 14:
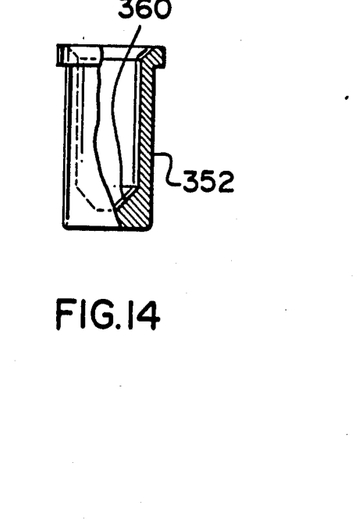
FIG. 14 is a part-sectional view of a thimble for the modified gripper jaw.

Various modifications are possible without departing beyond the scope of the present invention. One particular modification involves the gripper jaws and is illustrated in FIGS. 12 and 13. In the previously described embodiment, the gripper jaws comprise spring fingers 172 and 174, the inturned ends of which bear as knife edges against the fibers to clamp them into the apexes of the Vee grooves.

In FIG. 12, a part of gripper arm 182 is shown. A channel-shaped member 350 is secured to the end of the gripper arm 182 so as to extend parallel to the Vee-groove 134 and with its channel facing away therefrom. A tappet member in the form of a thimble-shaped member 352 is slidably located in a hole 354 extending through the base of the channel member 350 adjacent its distal end. A wire spring 356 is secured at one end to the gripper arm 182 by a screw 357, extends along the channel, and has its other end angled into the thimble-member 352.

A cover plate 358, also secured at one end to the gripper arm 182 extends along the mouth of the channel to cover the wire spring 356. The spring 356 urges the thimble member 352 lightly into contact with the fiber when the gripper arm is closed. It should be noted that the end surface of the thimble-member 352 is substantially flat so as to contact the fiber over a relatively large distance. Moreover, the corresponding internal end surface of the thimble-member 352 is formed as a conical seating 360. The end of the spring 356 cooperates with the seating 360 to permit slight pivotting of the thimble-member 352 to facilitate proper, flat seating of the thimble-member 352 against the fiber.

It should be appreciated that although the invention has been described with particular reference to fusion-splicing apparatus, it comprehends other applications where precise positioning is required, such as in positioning an optical fiber relative to a light source.

Although particularly useful for single mode fiber, the apparatus can be used to advantage with multimode fiber. Moreover, especially when aligning multimode fiber, the light signal might be dispensed with and the fiber position monitored solely visually. Conversely, visual monitoring, and consequently the associated mirror, might be omitted and alignment monitored solely by means of the light signal passing through the fibers.

What is claimed is:

1. Apparatus for manipulating an article in two intersecting directions relative to a datum comprising:
    a part fixed relative to said datum;
    a first arm coupled to said part by a first hinge;
    a second arm coupled by a second hinge to a portion of said first arm adjacent said first hinge, said second arm having at a position adjacent said second hinge a mount for supporting said article;
    means for displacing said arms pivotally to and fro in the same direction relative to their respective hinges;
    the arrangement being such that movement of the first arm about the first hinge displaces the second hinge, and therewith the mount, in one of said intersecting directions; and movement of the second arm about the second hinge displaces the mount in the other of said intersecting direction.

2. Apparatus as claimed in claim 1, wherein said hinges are integral with said arms.

3. Apparatus as claimed in claim 2, wherein said fixed part, hinges and arms comprise parts of a solid block, being defined by slots in said block.

4. Apparatus as claimed in claim 1, 2 or 3, wherein said arms extend substantially parallel to each other.

5. Apparatus as claimed in claim 1, wherein each means for displacing said arms comprises an eccentric cam member serving to displace said associated arm and further comprising means for rotating said cam member.

6. Apparatus as claimed in claim 5, wherein said eccentric cam member comprises an eccentrically mounted bearing.

7. Apparatus as claimed in claim 5 or 6, wherein said means for rotating said cam member comprises a rack and pinion.

8. Apparatus as claimed in claim 7, wherein the rack is coupled to a vernier drive for reciprocating longitudinal movement thereby.

9. Apparatus as claimed in claim 1, further comprising a Vee groove for supporting an elongate member with its longitudinal axis extending substantially perpendicular to said intersecting directions.

10. Apparatus as claimed in claim 9, wherein said datum comprises a second Vee groove disposed with its Vee groove surfaces substantially coplanar with those of the first-mentioned Vee groove.

11. Apparatus for aligning two filaments end-to-end comprising:
support means for supporting the two filaments in end-to-end alignment along an axis;
two gripping means, each cooperating with said support means to grip a respective one of said filaments to the support means and
two actuators, disposed at opposite sides, respectively, of a plane extending between said gripping means and substantially perpendicular to said axis;
wherein each actuator serves to operate the gripping means at the opposite side of said plane.

12. Apparatus as claimed in claim 11 wherein one of said gripping means is movable relative to the other in the direction of the longitudinal axis of said filaments.

13. Apparatus as claimed in claim 12, wherein the movable gripping means is mounted upon an arm pivotal about an axis exending transversely to said longitudinal axis.

14. Apparatus as defined in claim 11, wherein the support means comprises at least one Vee groove parallel to said axis for receiving the filaments.

15. Apparatus as defined in claim 14, wherein the support means comprises two Vee grooves, each of said Vee grooves for receiving a respective one of said filaments.

16. Apparatus as claimed in claim 11, 14, or 15 wherein each said gripping means comprises a pivotal jaw member, the apparatus further comprising a push-pull rod serving to transmit the action of the respective actuator to said jaw member.

17. Apparatus as claimed in claim 16, wherein one of said gripping means is movable relative to the other in the direction of the longitudinal axis of said filaments.

18. Apparatus as claimed in claim 17, wherein the movable gripping means is mounted upon an arm pivotal about an axis extending transversely to said longitudinal axis.

19. Apparatus as claimed in claim 11, wherein each said gripping means comprises a tappet member for contacting said filament over a significant part of its length and at a position disposed away from said apex, and biassing means for urging said tappet member towards said apex.

20. Apparatus as claimed in claim 19, wherein said biassing means comprises spring means arranged to contact said tappet member at a point-contact therebetween.

21. Apparatus as claimed in claim 20, wherein said tappet member comprises a thimble member arranged with its external end surface towards said apex and movable towards and away from said apex against the action of said biassing means and said biassing means is arranged to cooperate with the internal end surface of said thimble member.

22. Apparatus for aligning at least one filamentary article relative to a datum comprising:
a Vee groove for receiving said filamentary article in the apex thereof and;
gripping means for clamping said filamentary article into said apex;
wherein said gripping means comprises a thimble-shaped tappet member for contacting said filamentary article over a significant part of its length and at a position disposed away from said apex, and biassing means for urging said tappet member towards said apex, said tappet member being arranged with its external end surface disposed towards said apex and movable towards and away from said apex against the action of said biassing means, and said biassing means being arranged to cooperate with the internal end surface of said thimble member.

23. Apparatus as claimed in claim 22, wherein said biassing means comprises spring means arranged to cooperate with said tappet member at a point contact therebetween.

* * * * *

UNITED STATES PATENT AND TRADEMARK OFFICE
CERTIFICATE OF CORRECTION

PATENT NO. : 4,687,287

DATED : August 18, 1987

INVENTOR(S) : Helmut H. Lukas and Grant K. Pacey

It is certified that error appears in the above-identified patent and that said Letters Patent is hereby corrected as shown below:

On the cover sheet -

Line [73] Assignee: Delete Bell-Northern Research Ltd., Ontario, Canada

Substitute Northern Telecom Limited, Montreal, Canada

Col. 2 line 1 Attorney, Agent, or Firm- Delete Sidney Jelly; Substitute Thomas Adams Signed and Sealed this Seventh Day of June, 1988

Attest:

DONALD J. QUIGG

*Attesting Officer*      Commissioner of Patents and Trademarks